United States Patent [19]

Saari

[11] 4,348,261

[45] Sep. 7, 1982

[54] METHOD FOR DISTILLING A LIQUID

[76] Inventor: Risto Saari, Harjula, 02440 Luoma, Finland

[21] Appl. No.: 243,505

[22] Filed: Mar. 13, 1981

Related U.S. Application Data

[63] Continuation-in-part of Ser. No. 23,704, Mar. 26, 1979, abandoned.

[51] Int. Cl.³ .......................... B01D 1/26; B01D 3/02
[52] U.S. Cl. ........................................ 203/25; 203/27; 203/71; 203/100; 203/DIG. 8; 159/47 R
[58] Field of Search ...................... 203/21, 27, 100, 25, 203/DIG. 8, 10, 11, 71, 81, 73; 202/174; 159/17 R, 17 VS, 17 C, 18, 19, 47 R, 20 R, 20 CS

[56] References Cited

U.S. PATENT DOCUMENTS 3,351,120 11/1967 Goeldner et al. ................... 202/174
3,445,345 5/1969 Katzen et al. ......................... 203/27

Primary Examiner—Frank Sever
Attorney, Agent, or Firm—Steinberg & Raskin

[57] ABSTRACT

A continuous method and apparatus for distilling a liquid include conducting the distilling liquid through at least two successive distillation units operating at different temperature levels. The distilling liquid is vaporized in each distillation unit and the obtained vapor condensed into distillate by conducting the vapor into heat exchange relationship with the liquid discharged from the evaporators in a succeeding distillation unit which operates at a lower temperature level. At least one of the distillation units includes a plurality of communicating distillation stages, each distillation stage including an evaporator and a corresponding condenser.

11 Claims, 4 Drawing Figures

METHOD FOR DISTILLING A LIQUID

BACKGROUND OF THE INVENTION

This application is a continuation-in-part of application Ser. No. 23,704 filed Mar. 26, 1979, now abandoned.

This invention relates generally to methods and apparatus for distilling liquids and, more particularly, to such methods and apparatus wherein the liquid is distilled in a plurality of distillation units.

Distillation of liquids, such for example as sea water, is conventionally accomplished by a variety of methods and apparatus. More particularly, so-called vertical tube multieffect evaporation (VTE) and multi-stage flash distillation (MSF) methods presently find widespread use. However, both of these methods, while being advantageous in some respects, are not entirely satisfactory. Thus, these methods involve disadvantages which become clearly apparent when, for example, they are used to distill various types of industrial waste water to obtain distillates of desired concentration.

Thus, in a vertical tube evaporation arrangement, vaporization of the liquid mixture takes place on the inner surface of heat exchanger tubes. As a direct consequence, scale inevitably forms on the surface of the heat exchanger which is a prime disadvantage of this method.

In the case of multi-stage flash distillation arrangement, the same concentrated liquid is circulated over the entire temperature range of the distillation plant. This is disadvantageous in that the consequent elevation of the boiling point of the circulating concentrated liquid as well as the accompanying increase in viscosity essentially reduce the efficiency of the distillation plant. Such MSF type distillation further requires a large number of distillation stages in order to maintain the condenser, which is the most expensive component of the arrangement, at a reasonable size. This is due to the fact that the smaller the flashing temperature drop of the vaporizing liquid in each distillation stage, the larger the temperature difference is between the vapor and the cooling liquid.

SUMMARY OF THE INVENTION

Accordingly, one object of the present invention is to provide new and improved methods and apparatus for distilling liquids which essentially eliminate the disadvantages of conventional distillation arrangements as described above.

Another object of the present invention is to provide new and improved method and apparatus for distilling liquids of the multi-stage type wherein the flashing temperature drop in a distillation stage can be controlled, within limits, without the necessity of increasing the number of such distillation stages.

Still another object of the present invention is to provide new and improved methods and apparatus for distilling liquids whereby liquids having different concentrations at different temperatures can be processed so that the increase in the boiling point and viscosity of the liquid as the same is distilled is not effective over the entire temperature range of the distillation process.

A further object of the present invention is to provide new and improved methods and apparatus for distilling liquids wherein the liquid is vaporized by flashing within a free liquid space so that scaling on the surface of the heat exchanger is prevented.

Briefly, in accordance with the present invention, these and other objects are attained by providing a continuous method and apparatus which utilize a plurality of distillation units in which the liquid is vaporized, and wherein in at least one of the distillation units, the liquid is vaporized and the obtained vapor condensed in at least two distillation stages. More particularly, at least two successively interconnected distillation units are provided which operate at different temperature levels. The distilling liquid is vaporized in at least one evaporator in each distillation unit and the obtained vapor conducted over a corresponding condenser of the same distillation unit where it is condensed into distillate by conducting the liquid which has passed through the evaporators in the next succeeding distillation unit which operates at a lower temperature level into the condensers of the prior unit in indirect heat exchange relationship with the vapor. Thus, the liquid discharging from the evaporators in the succeeding distillation unit is conducted into the condensers of the prior or preceding distillation unit and acts as a coolant and absorbs the heat of vaporization of and condenses the vapor produced by the vaporization of the liquid in the corresponding evaporator to thereby produce the distillate. In this manner, the liquid flowing through the evaporators in each distillation unit is directed into the condensers of the prior distillation unit and acts as a coolant for condensing the vapor in the prior distillation unit.

At least one and preferably all of the distillation units includes a plurality of communicating distillation stages, each distillation stage including an evaporator and an associated condenser which communicate with each other so that the vapor evaporated in the evaporator flows to the condenser where it is condensed into distillate as described above. The distillation stages of each distillation unit are constructed so that the liquid to be distilled can flow from the evaporator of one stage to the evaporator of the next stage, which operates at a lower pressure, but such that vapor flow from one evaporator to the next is prevented.

Thus, the present invention comprises a method and apparatus wherein a liquid is distilled in at least two consecutively disposed distillation units operating at different temperature levels. In each of the distillation units, the distilling liquid is evaporated and the formed vapor condensed to produce distillate in indirect heat exchange with flowing liquid from the next or succeeding distillation unit which operates at a lower temperature level. In at least one of the distillation units, the distilling liquid is evaporated and condensed, respectively, in at least two distillation stages. In such a distillation unit, the distilling liquid is conducted from the evaporator in the preceding distilling stage to the evaporator in the next distilling stage where the prevailing pressure is lower than the pressure in the evaporator in the preceding stage. In this manner, the distilling liqid which flows through the evaporators is cooled at is passes from a preceding to a next distillation stage. According to the invention, the cooled distilling liquid is then conducted to the condensers in the preceding distillation unit which is operating at a higher temperature level and acts as a coolant to condense the vapor which is directed into indirect heat exchange relationship therewith from the corresponding evaporators of the preceding distillation unit. Thus, the distilling liquid or liquid to be evaporated which flows through the evaporators in the next distillation unit flows to the condensers in the distillation stages of the prior distillation unit which operates at a higher temperature and acts as a coolant therein. The liquid is heated through absorbtion of the latent heat of vaporization as it flows through the condensers of consecutive distillation stages and is then conducted back to the evaporators in the next distillation unit which operates at a lower temperature level.

It is seen from the above that the present invention differs from conventional multi-stage flash (MSF) and multi-effect (VTE) distillation arrangements. In MSF distillation techniques, the liquid is evaporated by flashing with the aid of thermal energy contained in the liquid and is condensed to produce distillate in the same distillation stage. VTE techniques differ in that in the operation of the same, the vapor produced in a partacular distilling effect or unit is condensed to become distillate in the next distilling effect which operates at a lower temperature and where the energy is turned over to the liquid being evaporated. The present invention can be considered a synthesis of these techniques. More particularly, the present invention is a multi-effect type distillation in that several effects I-N are used. However, it differs from conventional VTE arrangements in that each effect or unit comprises a plurality of stages $V_I$-$V_M$ and, furthermore, in that energy is transported from one effect or unit to another with the liquid and not with the vapor. Thus, in the present invention, evaporation is accomplished by flashing using thermal energy contained in the liquid whereupon the vapor is condensed in the same stage in which it was produced.

In the above manner, the disadvantages discussed above of the conventional VTE and MSF arrangements are eliminated. Thus, there can be no formation of scale on heat exchanger surfaces as frequently occurs in VTE arrangements while the same concentrated liquid is not circulated over the entire temperature range of the distillation plant. Further, a large number of distillation stages are not required in order to maintain the condensers at a reasonable size.

In one embodiment, the distilling liquid is fed into the last or lowest temperature distillation unit wherein a portion thereof becomes distillate and a portion is fed to the preceding units. Distillate can be removed from any unit and the final concentrate can be discharged from the liquid circulation of the highest temperature distillation unit.

In another embodiment, the distilling liquid is supplied into the system at the lowest temperature unit and is fed through preheaters incorporated in the distillation units flowing from the lowest to the highest temperature units. The feed liquid less the distillate is then fed into the evaporators of the next distillation unit. Additionally, the distillate obtained from the condensers in each unit is combined with the distillate obtained from the condensers in the next unit operating at a lower temperature. This countercurrent preheating arrangement, which is known per se, results in the highest concentration or final concentrate being in the unit which operates at the lowest temperature and from which the blow-down is obtained. Formation of boiler scale is even further reduced at lower temperature levels which is a remarkable advantage. Furthermore, only a single feed pump is required.

DESCRIPTION OF THE DRAWINGS

A more complete appreciation of the invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Figure 1:
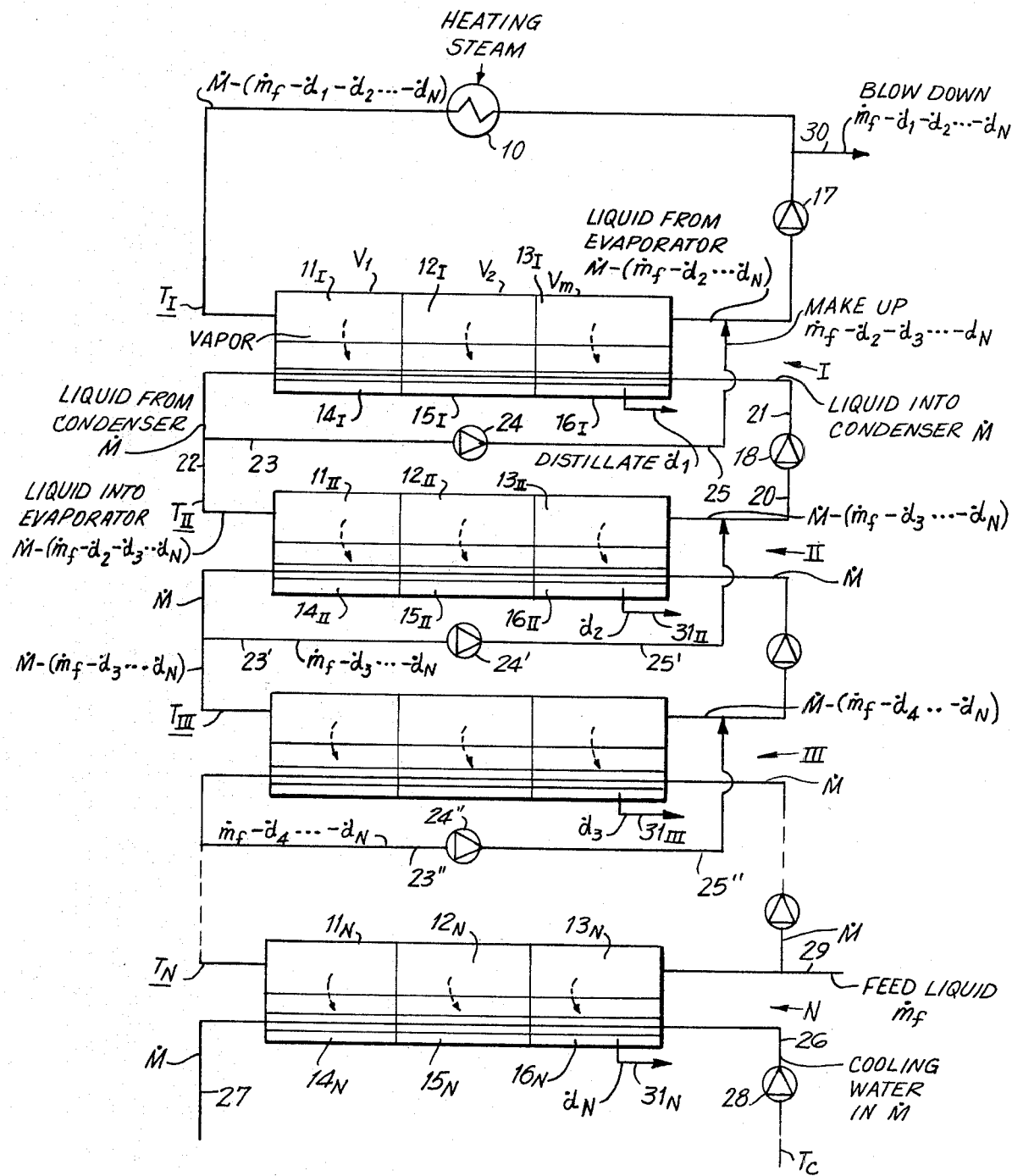
FIG. 1 is a schematic flow sheet diagram illustrating the method and apparatus of the present invention and showing mass balance designations thereon.
Figure 2:
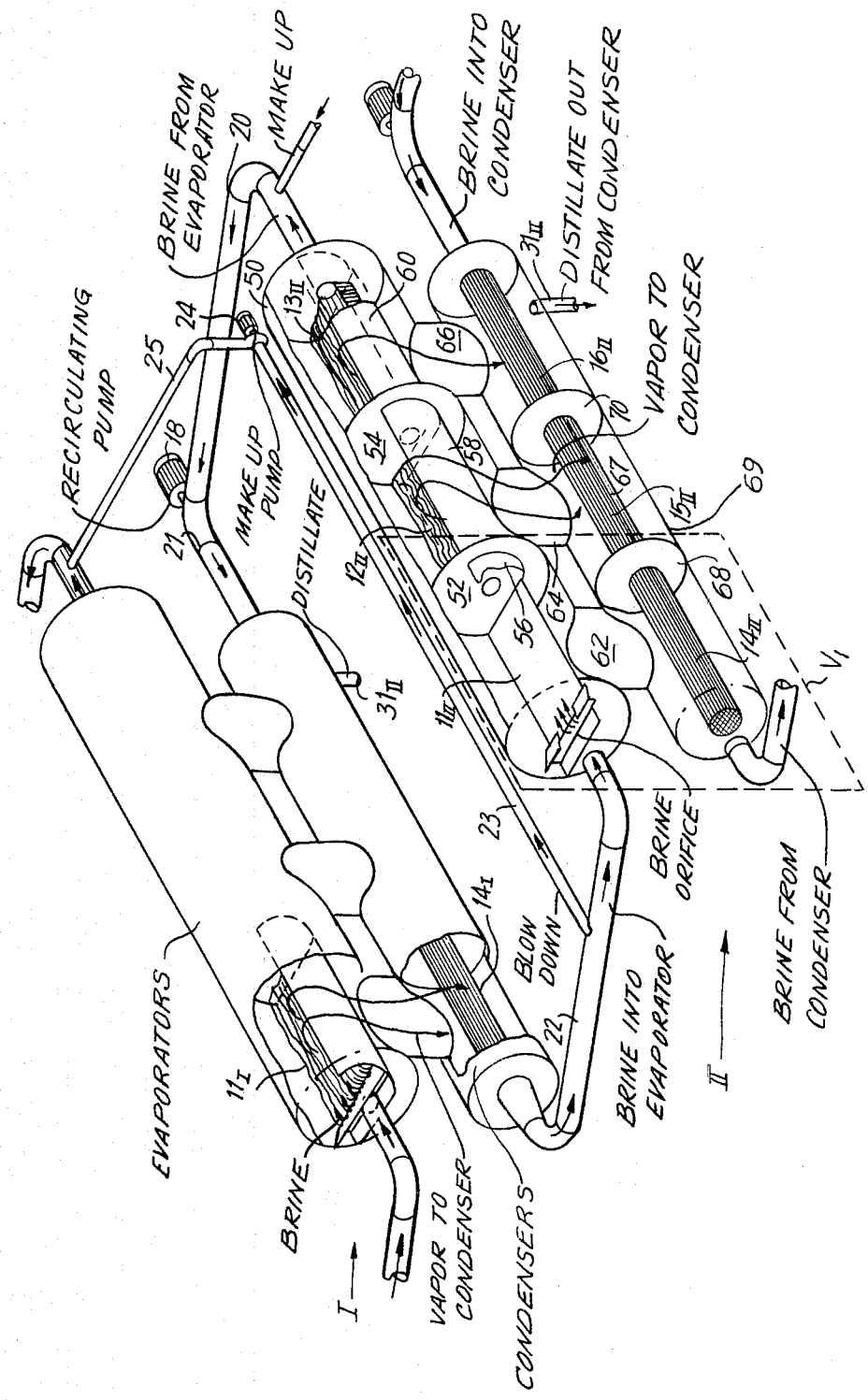
FIG. 2 is a schematic perspective view, partially broken away, illustrating two consecutive units of apparatus according to the present invention for performing the method thereof.

Referring now to FIGS. 1 and 2, the apparatus of the present invention is schematically illustrated in a manner which depicts the continuous flow of the liquid to be distilled, i.e., the distilling liquid, through the distillation units according to the method of the invention. More particularly, a plurality of N distillation units or modules I, II, III, ... N, are provided. In the illustrated embodiment, each distillation unit includes a plurality of distillation stages $V_1, V_2, ... V_m$, each distillation stage comprising an evaporator and a condenser which communicate with each other so that the vapor obtained by the flash vaporization of the liquid as the latter passes through the respective evaporator can flow to the associated condenser where it condenses into distillate.

Thus, according to the illustrated preferred embodiment, a typical distillation unit I includes m distillation stages, a first distillation stage $V_1$ including an evaporator $11_I$ and a condenser $14_I$, the second distillation stage $V_2$ including evaporator $12_I$ and condenser $15_I$, and the last distillation stage $V_m$ including an evaporator $13_I$ and a condenser $16_I$. The evaporators $11_I$, $12_I$ and $13_I$ are sequentially fluidly interconnected so that the liquid to be distilled can flow from evaporator $11_I$ to the evaporator $12_I$, to the succeeding evaporators and, finally, to evaporator $13_I$. However, the vapor obtained by the vaporization of the distilling liquid in each stage is prevented from flowing from one evaporator to another in the next stage but instead is conducted to the condenser in each distillation stage where it is condensed into a distillate as discussed below.

The flow of the liquid through distillation unit I is substantially typical of the flow of the liquid mixture through the subsequent distillation units. Thus, the liquid flows into the unit I to the evaporator $11_I$ in which part of the liquid flashes into vapor, the vapor being directed into and condensing in the condenser $14_I$. The liquid continues to flow within unit I to the evaporator $12_I$ in which a lower pressure prevails than in evaporator $11_I$. The liquid is partially vaporized by flashing as it passes through evaporator $12_I$, the vapor thus obtained condensing in condenser $15_I$. Of course, as the distilling liquid flows through distillation unit I with vaporization occurring as described above, the distilling liquid cools so that a cooled liquid discharges from the last evaporator $13_I$ into a fluid circuit. A pump 17 is provided in the fluid circuit which causes the cooled liquid to circulate to a heater 10 wherein it is heated and then directed to the first evaporator $11_I$ under the action of pump 17.

The liquid which flows through condensers $16_I$, $15_I$, and $14_I$ in a countercurrent manner with respect to the flow of the liquid through evaporators $11_I$, $12_I$ and $13_I$ comprises the liquid which has passed through the evaporators $11_{II}$, $12_{II}$ and $13_{II}$ of the next succeeding lower temperature distillation unit II and in which the same has been cooled. This liquid flowing through condensers $16_I$, $15_I$ and $14_I$ becomes warmer as it flows through unit I due to its absorption of the latent heat of evaporization from the condensing vapor. Thus, the warm liquid discharges from condensers $14_I$ and is directed via pipe 22 into the first evaporator $11_{II}$ of stage $V_1$ (FIG. 2) of distillation unit II which operates at a lower pressure and temperature than the first evaporator $11_I$ of the distillation unit I. The warmed liquid vaporizes in the evaporators $11_{II}$, $12_{II}$, and $13_{II}$ of the unit II thereby becoming cooler with the cooled liquid discharging from evaporator $13_{II}$. The discharging liquid flows via pipe 20, pump 18 and pipe 21 to the condensers $16_I$, $15_I$ and $14_I$ of the unit I where it is heated through absorption of the latent heat of evaporation as described above. In this manner, the condensers $16_I$, $15_I$ and $14_I$ function as heaters for the distilling liquid flowing through distillation unit II.

The distillation process described above in connection with units I and II proceeds in the same fashion between succeeding distillation units in a continuous manner until the heat energy supplied to the liquid by the heater 10 is transferred to the cooling water which flows into the last distillation unit N through pipe 26 under the action of pump 28 and through the condensers $16_N$, $15_N$ and $14_N$, discharging from the distillation unit N via pipe 27.

Referring to FIG. 1, the mass balance calculations for this first disclosed embodiment of the present invention is set forth. In FIG. 1 (and in FIG. 3 which illustrates another embodiment of the invention), $\dot{m}_f$ is the rate of input of the entire system, i.e., the rate at which liqid to be distilled is introduced, $\dot{M}$ is the rate at which the liquid to be distilled is circulating in each distillation unit, and $\dot{d}$ is the rate at which distillate is discharged wherein the subscript indicates the unit where the same was distilled.

The liquid to be distilled may be fed into the system at the last distillation unit N via pipe 29 where it is conducted through evaporators $11_N$, $12_N$ and $13_N$ where vaporization occurs, the vapors obtained being condensed into distillate $\dot{d}_N$ in respective condensers $14_N$, $15_N$ and $16_N$ which are cooled by cooling water which enters condenser $16_N$ through pipe 26 at a temperature $T_c$ and exits from condenser $14_N$ through pipe 27.

Referring to FIG. 1, four distillation units are illustrated (i.e., N=4). However, it is understood that additional distillation units may be interposed into the system between units III and N as designated by the dotted lines depicting the portions of the fluid conduit including the condensers of unit III and the evaporators of unit N.

A part of the cooled distilling liquid discharging from the last evaporator $13_N$ of unit N is conducted into the condensers of the preceding distillation unit (N-1), which is unit III in FIG. 1, where it acts as a coolant to condense the vapor directed over those condensers as described above.

A portion $\dot{m}_f - \dot{d}_4 \ldots -\dot{d}_N$ is fed to the prior modules or units. In the illustrated embodiment where N=4, a portion $\dot{m}_f - \dot{d}_4$ of the distilling liquid is conducted by pump $24''$ through branch pipes $23''$ and $25''$ into the liquid circulation of module III, i.e., a fluid circuit which includes the evaporators of unit III and condensers of unit II. From this liquid circuit, a portion of the distilling liquid, $\dot{m}_f - \dot{d}_3 \ldots -\dot{d}_N$, is conducted by pump $24'$ through branch pipes $23'$ and $25'$ into the liquid circulation of module II, i.e., a fluid circuit which includes the evaporators of unit II and condensers of unit I. Similarly, a part of the liquid circulation of module II, namely, $\dot{m}_f - \dot{d}_2 - \dot{d}_3 \ldots -\dot{d}_N$, is conducted by pump 24 through branch pipes 23 and 25 into the liquid circulation of module I. Distillates $\dot{d}_3$, $\dot{d}_2$ and $\dot{d}_1$ are discharged from the evaporators of units III, II and I through pipes $31_{III}$, $31_{II}$ and $31_I$, respectively. The final concentrate or blow-down, namely, $\dot{m}_f - \dot{d}_1 - \dot{d}_2 \ldots -\dot{d}$, is discharged from the liquid circulation of module I.

Although the liquid to be distilled is shown in the illustrated preferred embodiment as being fed into the last distillation unit N, depending upon the temperature thereof, the liquid can be fed to any of the distillation units and, similarly, the final concentrate can be discharged, depending upon its characteristics, from a distillation unit other than unit I.

The distillate can be discharged from each module I, II, ... N separately through pipes $31_I$, $31_{II} \ldots 31_N$, as shown, or from the last distillation unit N which operates at the lowest temperature in the system. This latter alternative is achieved by collecting all of the distillate in the module N and discharging the same therefrom through the pipe $31_N$.

The mass balance for the flow of distilling liquid through the various distillation units is shown in FIG. 1 and such flow is essentially similar in each unit. For example, referring to the liquid circulation of module II, the distilling liquid flowing into and discharging from the condensers of module I is designated $\dot{M}$. The liquid $\dot{M}$ flowing from the condensers is divided into a make-up flow, $\dot{m}_f - \dot{d}_2 - \dot{d}_3 \ldots -\dot{d}_N$ which is supplied through branch pipes 23 and 25 to the liquid circulation of module I and a flow $\dot{M} - (\dot{m}_f - \dot{d}_2 - \dot{d}_3 \ldots -\dot{d}_N)$ which is directed through pipe 22 into the evaporators of module II. A part of this flow is vaporized, condensed and discharged as distillate $\dot{d}_2$ while a part of the flow, $\dot{M} - (\dot{m}_f - \dot{d}_3 \ldots -\dot{d}_N)$ discharges from the evaporators of unit II. Added to the latter is the make-up flow, $\dot{m}_f - \dot{d}_3 \ldots -\dot{d}_N$, from the liquid circulation of module III.

From the above, it is seen that the method of the present invention allows for the concentration of the flowing liquid to be adjusted in each module I, II, ... N, in a separate and independent manner. This provides a considerable advantage especially when the present invention is used in connection with obtaining a concentrate from industrial waste water. It is also seen that the boiling point elevation of the liquid effects essentially only in a portion of the temperature range. Additionally, corrosion and scaling inhibitors can be added to the flow system of each separate distillation unit or, alternatively, such inhibitors may be added to single ones of such fluid systems such, for example, as to the system in which the distilling liquid has the highest concentration.

According to a feature of the apparatus of the present invention, the condensers in each distillation unit can be constructed below the free liquid surfaces of the evaporators through the use of horizontally extending tubes so long as the liquid flowing through the condensers as described above is not vaporized. A further advantage of the present invention is that the distillation plant can be constructed of substantially identical distillation units as described below thereby materially reducing the costs of planning and building of the distillation plant.

For example, as seen in the embodiment of FIG. 2, the evaporators 11, 12 and 13 of the stages $V_1$, $V_2$ and $V_3$ of a particular module or unit are defined by plates extending through an outer cylindrical sheet 50 and over which the distilling liquid flows, the plates being separated by two vertical walls 52, 54 in which central openings are formed to provide liquid interconnection between adjacent stages. The levels of the liquid is such that flow of vapor through the openings is prevented. The distilling liquid is prevented from falling from the plates by inner shells 56, 58 and 60 which are open at their top to allow the flashing vapor to be directed through passages 62, 64 and 66 into respective condensers 14, 15 and 16. The condensers are defined by a continuous tube 67 extending through a cylindrical shell 69 and a pair of vertical walls 68 and 70 which fluidly isolate adjacent condensers of stages $V_1$, $V_2$ and $V_3$ from each other.

The distinct advantages prevented by the method and apparatus of the present invention become clearly apparent from the following mathematical analysis. Thus, the average logarithmical temperature difference between a vapor and the cooling liquid flowing in the condenser, $\Delta T$, can be written as follows:

$$T = \frac{\delta T/m}{\ln\left\{\dfrac{\delta_o T - \Sigma_1^N \delta'T - \delta T}{\delta_o T - \Sigma_1^N \delta'T - \delta T - N\dfrac{\delta T}{m}}\right\}}$$

where $\delta_o T$ is the difference between the highest and the lowest temperatures of the distilling liquid $(T_I - T_C)$, $\delta'T$ is the boiling point elevation of the distilling liquid and $\delta T$ is the flashing temperature drop of the distilling liquid as it flows through all of the distillation stages of one distillation unit.

The temperature difference $\Delta T$ has a direct effect on the size of the condensers required for use in the system which are, of course, the most expensive components of the distillation plant. From the above formula it is seen that this temperature difference $\Delta T$ depends on the flashing temperature drop in each distillation stage, designated $\delta T/m$. This, of course, is the same in MSF-distillation processes. However, the essential and important difference between conventional systems and that of the present invention is that once $\delta_o T$ is determined in MSF-distillation, $\delta T/m$ can be reduced only by increasing the number of distillation stages. However, in the method of the present invention, $\delta T/m$ can be adjusted regardless of the toal temperature difference $\delta_o T$ merely by changing the liquid flow rate in each module I, II, ... N and the dimensioning of the condensers.

For example, in the present invention, if $\delta_o T = 60°$ C., $\delta'T = 1°$ C. and the performance ratio of the MSF-distillation (proportion of the produced distillate to the quantity of the heating steam required) has a value of 8, the logarithmic mean temperature difference will be 5.09° C. If the design temperature range is the same, the logarithmic mean temperature difference will be 5.61° C. in a distillation plant constructed according to the present invention, when $N=8$, $m=3$ and $\delta T = 3°$ C. Thus, it is seen that a plant having a corresponding distillation capacity constructed according to the present invention will have a 10% smaller condenser and only 24 distillation stages in all. This is to be compared with the previous result which required 48 distillation stages in conventional MSF-processes.

It can also be seen from the above-noted formula that the elevation in the boiling point of the liquid mixture $\delta'T$ can be adjusted so as to be different in different distillation units. These boiling point elevations affect the average logarithmic temperature difference $\Delta T$ according to their sum. The boiling point elevation of the liquid mixture having the highest concentration thus affects only a single distillation unit and does not depend upon the entire temperature range over the entire process.

According to the invention, the condensers in each distillation unit are located at a lower elevation than the free surface of the liquid mixture flowing through the evaporators of the next following distillation unit. It is also preferable to provide each of the distillation units according to this structure. In this manner, it will be seen that the liquid will not vaporize as it flows as a cooling medium in the condensers thereby avoiding the scaling of the heat exchange surfaces which, obviously, would decrease efficiency by essentially decreasing the capability for heat exchange across the heat exchange surface. Thus, the disadvantage which prevails is conventional VTE-distillation processes, especially when such processes function to concentrate liquids, and which are due to the fact that the vaporization in such VTE-distillation processes takes place on the surfaces of heat exchanger tubes, is eliminated. Thus, contrary to conventional processes, the present invention provides a method wherein the inner surfaces of the heat exchanger tubes are continuously maintained in a clean condition. In this connection, an appropriate quantity of sponge balls may be disposed in the circulation system for the liquid mixture.

As mentioned, it is preferable to construct a distillation plant according to the present invention with a plurality of similar distillation units, as described above, in order to reduce the capital costs of the plant.

Figure 3:
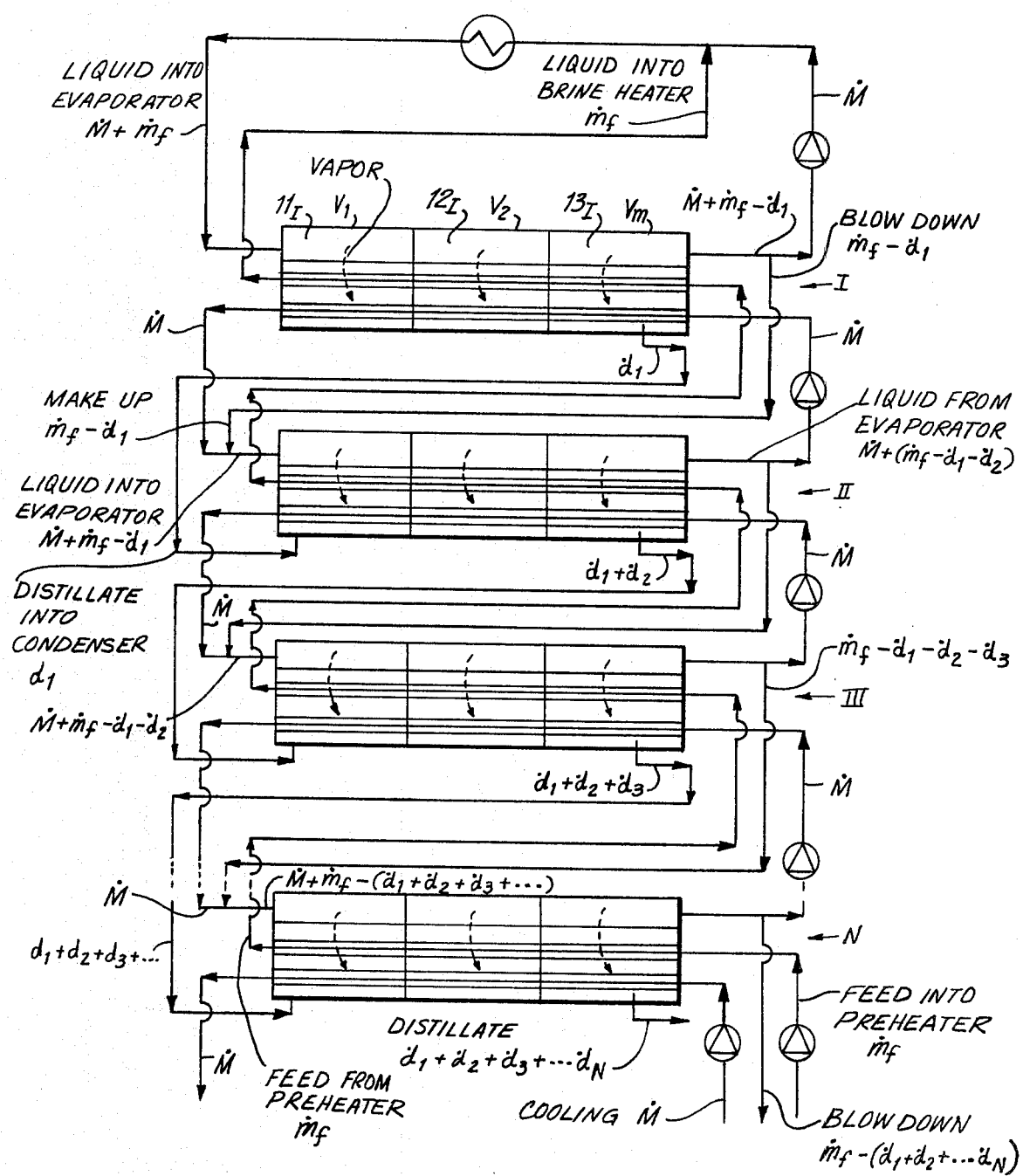
FIGS. 3 and 4 are views similar to FIGS. 1 and 2, respectively, illustrating another embodiment of the method and apparatus of the present invention.
Figure 4:
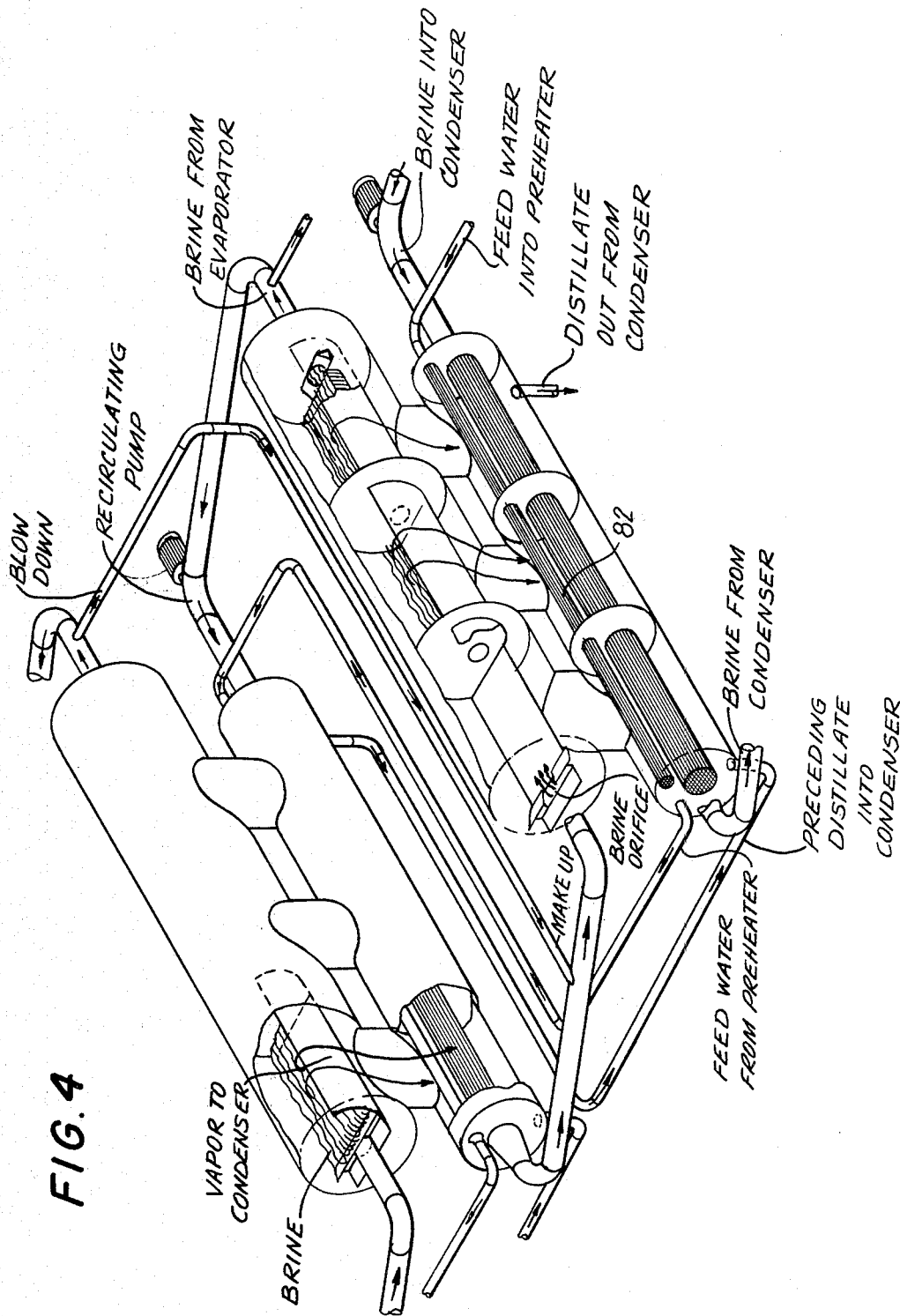

Referring now to FIGS. 3 and 4, another embodiment of the present invention is illustrated which substantially incorporates the principles of the invention discussed above in connection with FIGS. 1 and 2. However, the embodiment illustrated in FIGS. 3 and 4 differs from that of FIGS. 1 and 2 in that the distilling liquid $\dot{m}_f$ is supplied into the system through a preheating system. More particularly, separate preheater tubes 82 (FIG. 4) extend through condenser shells of the respective distillation units and are interconnected by appropriate connecting pipes. The distilling liquid $\dot{m}_f$ is introduced into the system into the preheater tube $82_N$ of distillation unit N operating at the lowest temperature and flows through the preheating system to units operating at successively higher temperatures ultimately reaching the preheater tube $82_1$ of unit I operating at the highest temperature. The preheated feed liquid $\dot{m}_f$ is then introduced into the liquid circulation of unit I. As seen in FIG. 3, the distilling liquid entering the evaporators of unit I in steady state operation is $\dot{M} + \dot{m}_f$ and the liquid leaving the evaporator is $\dot{M} + \dot{m}_f - \dot{d}_1$. A portion $\dot{m}_f - \dot{d}_1$ of the distilling liquid is separated as a blow-down and introduced as make-up into the liquid circulation of module II. A typical mass balance for the system is shown in FIG. 3.

The embodiment of the invention illustrated in FIGS. 3 and 4 differs from that shown in FIGS. 1 and 2 in that the distillate obtained from the condensers of each distillation unit is directed into the condensers of the succeeding distillation unit whereby the final distillate $\dot{d}_1 + \dot{d}_2 + \dot{d}_3 + \ldots \dot{d}_N$ is discharged from the distillation unit N operating at the lowest temperature level.

The countercurrent preheating arrangement of the embodiment illustrated in FIGS. 3 and 4, although known per se, when used in the arrangement of the present invention, results in the highest concentration concentrate $\dot{m}_f - (\dot{d}_1 + \dot{d}_2 + \ldots + \dot{d}_N)$ being discharged from the evaporators of the distillation unit N operating at the lowest temperature. This is advantageous in that formation of boiler scale will be even less at lower temperatures. Further, the arrangement of FIGS. 3 and 4 requires only a single feed pump which is to be compared to the several feed pumps required in the embodiment of FIGS. 1 and 2. As noted, the blow-down is taken from the hottest distillation unit.

Obviously, numerous modifications and variations of the present invention are possible in the light of the above teachings. It is therefore to be understood that within the scope of the claims, the invention may be practiced otherwise than as specifically disclosed herein.

What is claimed is:

1. A method for distilling liquids in at least two consecutively disposed distillation units which operate at different respective temperature levels, and wherein said units each include at least two consecutive distillation stages, each stage including an evaporator and associated condenser, and evaporator in one stage adapted to operate at a prevailing pressure which is lower than the prevailing pressure in the preceding stage in the direction of flow of distilling liquid through the evaporators thereof, comprising the steps of:

passing distilling liquid through evaporators of the respective stages of a first preceding distillation unit wherein in each of said stages the distilling liquid is evaporated and the vapor formed directed into the associated condenser of the respective stage of said first preceding distillation unit;

passing distilling liquid through evaporators of the respective stages of a second succeeding distillation unit operating at a lower temperature level than said first preceding distillation unit and wherein the prevailing pressure in each evaporator is lower than the prevailing pressure in the evaporator in the preceding distilling stage so that the distilling liquid is cooled as it passes through the evaporators of the respective stages, said distilling liquid being at least partially evaporated in each of said stages and wherein the vapor formed is directed into the associated condensers of the respective stages of said second succeeding distillation unit for being condensed therein;

conducting the cooled distilling liquid from the last evaporator of the second succeeding unit into the condensers of said first preceding distillation unit which is operating at a higher temperature level than that of the succeeding unit wherein the cooled distilling liquid in the first preceding distillation unit flows in countercurrent relationship to the distilling liquid passing through the evaporators of said first preceding distillation unit with the cooled distilling liquid passing from the condenser in a distillation stage of said first unit to the condenser in the preceding distillation stage thereof wherein the pressure is higher, said cooled distillation liquid being brought into indirect heat exchange with the vapor which has been directed into the condensors of said first preceding distillation unit so that the cooled distilling liquid from the evaporators of the second succeeding distillation unit acts as a coolant in the condensers of said first preceding distillation unit whereby the vapor present in the condensers of said first preceding distillation unit is condensed to become distillate, said cooled distilling liquid being heated in the preceding unit as it flows in the condensers thereof from a distilling stage to a preceding distilling stage thereof; and conducting the heated distilling liquid back from the last condenser in the first preceding distillation unit where it acted as a coolant to the succeeding distillation unit operating at a lower temperature level and into the evaporators thereof.

2. The method of claim 1 wherein the cooled distilling liquid is conducted through the condensers in each distillation unit in counterflow relation to the flow of distilling liquid which is being passed through the evaporators thereof.

3. The method of claim 1 wherein each of the preceding and succeeding distillation units includes at least two distillation stages.

4. The method of claim 1 including the further step of discharging the distillate from the same unit in which it is formed.

5. The method of claim 1 including the further step of directing the distillate formed in each unit into a particular distillation unit and discharging the combined distillates therefrom.

6. The method of claim 5 wherein said particular distillation unit is the one operating at the lowest temperature level.

7. The method of claim 1 including the further step of feeding the distilling liquid into the liquid circulation of a particular unit wherein it passes through the evaporators of that particular unit and the condensers of the preceding distillation unit; directing a portion of the distilling liquid from the liquid circulation of that particular unit to the liquid circulation of the preceding distillation unit wherein it passes through the evaporators of that preceding distillation unit and the condensers of a next preceding unit; and discharging the concentrated distilling liquid from a distilling unit other than the one into which the distilling liquid is fed.

8. The method of claim 7 wherein the concentrated distilling liquid is discharged from the distilling unit operating at the highest temperature.

9. The method of claim 1 including the further step of feeding the distilling liquid into means located in at least one of said distillation units for preheating the same and directing a portion of the distilling liquid from said preheating means into the liquid circulation of another distillation unit wherein the distilling liquid passes through the evaporators of that another distillation unit and the condensers of a preceding unit operating at a higher temperature.

10. The method of claim 9 wherein each of said distillation units includes means located therein for preheating the distilling liquid, and further including the steps of directing the distilling liquid from the preheating means of the unit into which the liquid is fed into the preheating means located in the preceding units operating at progressively higher temperature levels in a sequential manner and directing the preheated distilling liquid into the liquid circulation of the distillation unit operating at the highest temperature level.

11. The method of claim 10 further including the step of discharging the concentrated distilling liquid from the distilling unit operating at the lowest temperature.

* * * * *